June 12, 1962  R. E. PETERSEN  3,038,754
CABLE AND CONDUIT PULLER
Filed April 4, 1960

INVENTOR
ROBERT E. PETERSEN
BY
ATTORNEY

United States Patent Office 3,038,754
Patented June 12, 1962

3,038,754
CABLE AND CONDUIT PULLER
Robert E. Petersen, 1917 Bridge Ave., Albert Lea, Minn.
Filed Apr. 4, 1960, Ser. No. 19,541
3 Claims. (Cl. 294—94)

The present invention relates to "expansible" devices for gripping the inner peripheral surfaces of objects such as cable, conduit and the like. My invention has particular applicability in the electrical trade as a puller for installing and removing electrical conduit.

By "electrical conduit" is meant annular tube-like enclosures through which, after installation thereof in place, electrical wiring is drawn; including rigid metal conduit, electrical metallic tubing (sometimes referred to as "thin wall" steel tubing), and flexible metal conduit (often referred to as "Greenfield").

In installing electrical wiring, particularly in old construction where the wiring must be installed in confined spaces such as between walls, it is often awkward and difficult to install electrical conduit. This is especially true where the junction boxes which the conduit interconnects are some distance apart.

There is much need for a device which can hold or grip the ends of the conduit so that the conduit may be pulled or guided through a substantial distance in confined spaces, which is small enough to pass through the "knockout" holes in the sides of junction boxes through which the ends of the cable and conduit extend for fastening, and which can be readily withdrawn from the ends of the conduit after they are inside the junction box. It is a primary object of the present invention to provide such a puller for electrical conduit.

The manner in which this and other objects and advantages are efficiently and simply attained will be apparent from the description of my invention which follows, in conjunction with the accompanying drawings, wherein like reference characters refer to corresponding parts in the several views, and in which.

Figure 1:
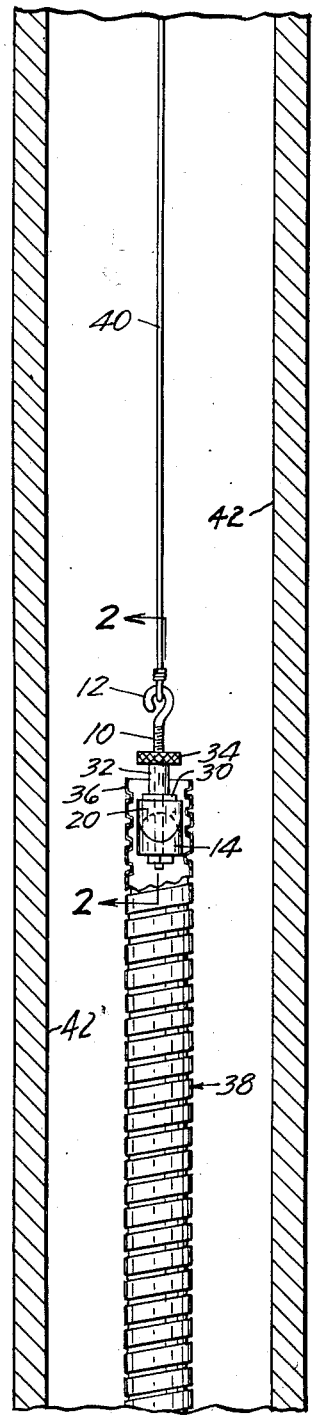
FIGURE 1 is a view of my novel device fixed in position inside a flexible electrical cable for pulling the cable within a confined wall space.
Figure 2:
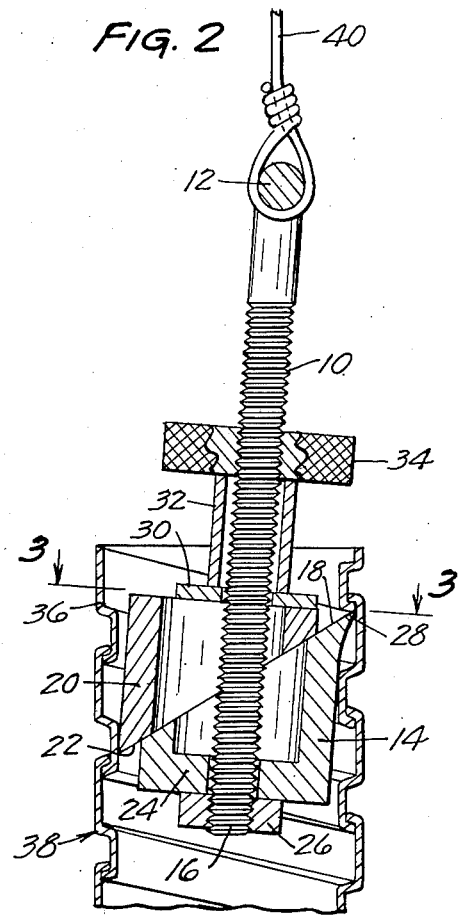
FIGURE 2 is an enlarged section view showing the construction of my novel cable and conduit puller, taken along the lines 2—2 of FIGURE 1.
Figure 3:
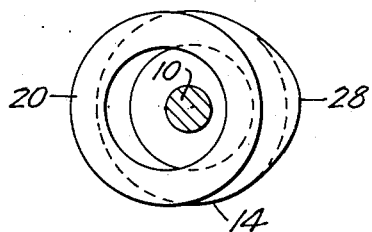
FIGURE 3 is a view taken along the lines 3—3 of FIGURE 2.

Referring now to the drawings, and particularly to FIGURES 2 and 3 thereof, a preferred embodiment of my device is seen to comprise a threaded shaft 10 having a hook 12 on one end thereof. The shaft may have a diameter, for example, of about ⅛ inch and a length of perhaps 2½ inches. An obliquely truncated cylindrical wedge 14 is affixed on the end 16 of shaft 10 opposite the hook end 12. The cylindrical wedge is affixed on the shaft generally axially thereof with the inclined truncated face 18 of the cylindrical wedge 14 disposed toward hook 12.

A mating obliquely truncated wedge 20 is journaled on shaft 10, between the hook end 12 and the cylindrical wedge 14, with the inclined truncated face 22 of mating wedge 20 disposed generally in mating relationship with respect to cylindrical wedge 14. The mating wedge 20 is disposed on shaft 10 for movement in the direction both along the shaft and also parallel with the inclined faces 18 and 22 of the wedges 14 and 20.

The wedges 14 and 20 can conveniently be formed from a single piece of cylindrically shaped hardened steel stock having a diameter of, for example, about ¾ inch and a length of about ¾ inch. The stock is drilled axially thereof to provide a hole, which when tapped, threadably will engage shaft 10. The stock then is counterbored, the counterbore having a diameter of for example about ½ inch or slightly less, to a depth not quite the full length thereof. Thus an end wall is left in one end of the stock which forms end wall 24 of cylindrical wedge 14. The stock is then truncated at an angle of 45° to provide the two wedge members.

The cylindrical wedge 14 is mounted on shaft 10 by turning shaft 10 into the drilled and tapped hole in end wall 24 of cylindrical wedge 14, until the shaft protrudes through the end wall 24 slightly. The nut 26 is then turned on the shaft and turned up tightly against end wall 24. The end of the shaft can then be upset so as to fix nut 26 permanently in place.

It will be seen that the oblique truncation of the cylindrical wedge defines at one end thereof, between the inclined face 18 and the cylindrical outside surface of the wedge 14, an acute angular gripping edge 28. As shown in FIGURE 3, this gripping edge is curved in conformance with the cylindrical exterior of the wedge 14. Although this edge 28, without more, is generally suitable, I prefer to upset the edge radially outwardly slightly so that the curved exterior thereof extends outwardly at an angle of about 15° to the axial direction; see FIGURE 2. In this fashion a pronounced protruding gripping edge is defined.

As a result of the counterboring operation in the formation of the wedges 14 and 20, the mating wedge 20 is journaled very loosely about shaft 10. It can be moved along the shaft, and it can also be moved transversely thereto, for example in a direction parallel with the inclined faces 18 and 22 of the wedges.

Means are provided for forcing the mating wedge 20 along shaft 10 toward cylindrical wedge 14. As can be seen particularly from FIGURE 2, as the mating wedge 20 comes against wedge 14 further force thereon in the axial direction causes it to slide transversely along and parallel to the inclined face 18 of wedge 14. Thus the gripping edge 28 protrudes laterally of the mating wedge 20. The further wedge 20 is moved toward wedge 14, within the dimensional limits of the several members, the further laterally of said wedge the gripping edge 28 extends. The means for forcing the mating wedge 20 against cylindrical wedge 14 comprise washer 30, bushing 32, and knurled nut 34. The washer 30 and the bushing 32 are slidably journaled about shaft 10, while the knurled nut 34 is journaled about shaft 10 in threadable engagement therewith. Thus as knurled nut 34 is turned on shaft 10 toward cylindrical wedge 14, pressure is applied to bushing 32, in turn against washer 30 and finally against mating wedge 20 forcing the latter along shaft 10 and against cylindrical wedge 14.

When my device is to be used, the knurled nut 34 initially is turned along shaft 10 toward the hook end 12 so that the mating wedge 20 is in a position generally co-axially with cylindrical wedge 14. The device is then slipped inside the end 36 of the electrical conduit, here exemplified by flexible metal conduit ("Greenfield") 38. The knurled nut 34 is then turned on shaft 10 toward cylindrical wedge 14 thereby "expanding" the device. As the device "expands" by reason of mating wedge 20 sliding transversely with respect to cylindrical wedge 14, the protruding edge 28 firmly engages the side of the conduit. The gripping action is facilitated by the curved nature of the gripping edge 28. This is true generally irrespective of the type of conduit used; but it can be seen how the edge 28 fits and extends into a groove of the sections forming the flexible conduit 38. When knurled nut 34 has been turned up so that the device is snugly in place, a flexible member such as a steel tape 40 is fastened to the hook end 12. At this stage, the cable then can conveniently be pulled as desired within confined spaces, e.g., between wall partitions 42 in a building. The greater the pulling force, the tighter the edge 28 "bites" and holds. The gripping action is also facilitated by the tilting of the device in the cable (see FIGURE 2) which causes edge 28 to bear against the cable wall at an angle to the direction of pull. The tilting, in turn, occurs as a result of the lever action arising between the protruding edge 28 and the point of pull on the device through steel tape 40, due to the lateral distance therebetween, most of the pulling force exerted against the cable wall being transmitted through edge 28.

When the end of the cable has been pulled through the wall space or the like and comes adjacent the junction box to which it is to be affixed, the steel tape 40 is pulled through the knockout hole in the side of the junction box. While the conduit end is held, tape 40 is disconnected. The usual connector is then applied to the conduit end and the assembly positioned and fixed in place in the junction box. The knurled nut 34 is then turned loose allowing wedges 14 and 20 to slide more to a coaxial relation, and the puller is pulled free of the cable within the junction box and removed.

Although I have described my invention in connection with a single preferred and illustrative embodiment, various equivalents undoubtedly suggest themselves, and it is not my intention to be limited by the illustrative embodiment shown, but rather only by the specification as a whole, including the appended claims.

I claim:

1. A cable and conduit puller comprising a shaft having means on one end thereof adapted to attach to pulling means, an obliquely-truncated cylindrical wedge affixed generally axially on said shaft with the inclined truncated face of said wedge disposed toward said one end of said shaft, the cylindrical sides and said inclined face of said wedge defining an acute angular curved gripping edge, a mating obliquely-truncated wedge journaled on said shaft with the inclined truncated face thereof disposed generally in mating relationship to said cylindrical wedge, said mating wedge being disposed on said shaft for movement both along said shaft and in a direction parallel with said inclined surfaces, and releasable means on said shaft adjacent said one end for forcing said mating wedge against said cylindrical wedge.

2. A cable and conduit puller comprising a shaft terminating in a hook at one end thereof, an obliquely-truncated cylindrical wedge affixed generally axially on said shaft with the inclined truncated face of said wedge disposed toward said hook, the sides of said wedge flaring outwardly and defining with said inclined face a radially outwardly protruding acute angular curved gripping edge, a mating obliquely-truncated wedge journaled on said shaft with the inclined truncated face thereof disposed in mating relationship to said cylindrical wedge, said mating wedge being disposed on said shaft for movement both along said shaft and in a direction parallel with said inclined surfaces, and means including a rotating member journalled on and threadably engaged with said shaft adjacent said hook for applying axial force toward said cylindrical wedge when rotated in one direction and releasing said force when rotated in the opposite direction.

3. A cable and conduit puller comprising a shaft terminating in a hook at one end thereof, an obliquely-truncated first wedge affixed generally axially on said shaft with the inclined truncated face of said wedge disposed toward said hook, the sides of said wedge flaring outwardly and defining with said inclined face a radially outwardly protruding acute angular curved gripping edge, a mating obliquely-truncated wedge journaled on said shaft with the inclined truncated face thereof disposed in mating relationship to said first wedge, said mating wedge being disposed on said shaft for movement both along said shaft and in a direction parallel with said inclined surfaces, and means including a rotating member journaled on and threadably engaged with said shaft adjacent said hook for applying axial force toward said first wedge when rotated in one direction and releasing said force when rotated in the opposite direction.

References Cited in the file of this patent

UNITED STATES PATENTS

| | | |
|---|---|---|
| 2,174,451 | Strange | Sept. 26, 1939 |
| 2,563,675 | Edwards | Aug. 7, 1951 |
| 2,918,840 | Roesler | Dec. 29, 1959 |